US 8,625,436 B2

United States Patent
Ponnuswamy

(12) United States Patent
Ponnuswamy

(10) Patent No.: US 8,625,436 B2
(45) Date of Patent: Jan. 7, 2014

(54) DISPLAYING A WIDEBAND SPECTRUM USING A NARROWBAND RECEIVER

(75) Inventor: Subburajan Ponnuswamy, Cupertino, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 205 days.

(21) Appl. No.: 13/080,552

(22) Filed: Apr. 5, 2011

(65) Prior Publication Data

US 2011/0242984 A1 Oct. 6, 2011

Related U.S. Application Data

(60) Provisional application No. 61/321,210, filed on Apr. 6, 2010, provisional application No. 61/321,179, filed on Apr. 6, 2010, provisional application No. 61/321,214, filed on Apr. 6, 2010.

(51) Int. Cl.
*H04L 12/26* (2006.01)

(52) U.S. Cl.
USPC ............ 370/241; 370/310; 370/328; 370/338

(58) Field of Classification Search
None
See application file for complete search history.

(56) References Cited

U.S. PATENT DOCUMENTS

| | | | | |
|---|---|---|---|---|
| 6,850,735 | B2* | 2/2005 | Sugar et al. | 455/67.11 |
| 7,079,812 | B2* | 7/2006 | Miller et al. | 455/63.1 |
| 7,460,837 | B2* | 12/2008 | Diener | 455/67.7 |
| 7,596,181 | B2* | 9/2009 | Chang et al. | 375/260 |
| 7,653,020 | B2* | 1/2010 | Roberts | 370/318 |
| 7,715,800 | B2* | 5/2010 | Sinha | 455/67.11 |
| 7,929,508 | B1* | 4/2011 | Yucek et al. | 370/338 |
| 8,457,023 | B2* | 6/2013 | Norlen et al. | 370/281 |
| 2004/0023674 | A1* | 2/2004 | Miller | 455/462 |
| 2005/0227625 | A1* | 10/2005 | Diener | 455/67.7 |
| 2008/0227401 | A1* | 9/2008 | Scherzer et al. | 455/67.13 |

* cited by examiner

*Primary Examiner* — Charles C Jiang
*Assistant Examiner* — Amy Ling
(74) *Attorney, Agent, or Firm* — Varun A. Shah

(57) ABSTRACT

Methods of aggregating spectrum data captured from a narrowband radio to form a spectrum covering a much wider frequency band. Frequency data, such as FFT spectrum data captured from a narrowband receiver such as an IEEE 802.11 Wi-Fi receiver are combined to display representative real-time FFT, average FFT, and FFT duty cycle data of a wideband spectrum. Data is captured from narrow band radios such as access points, station monitors, or client devices on a wireless network. A wideband spectrum may be aggregated from data captured from one or from multiple devices. Data may be stored for later analysis and display.

26 Claims, 1 Drawing Sheet

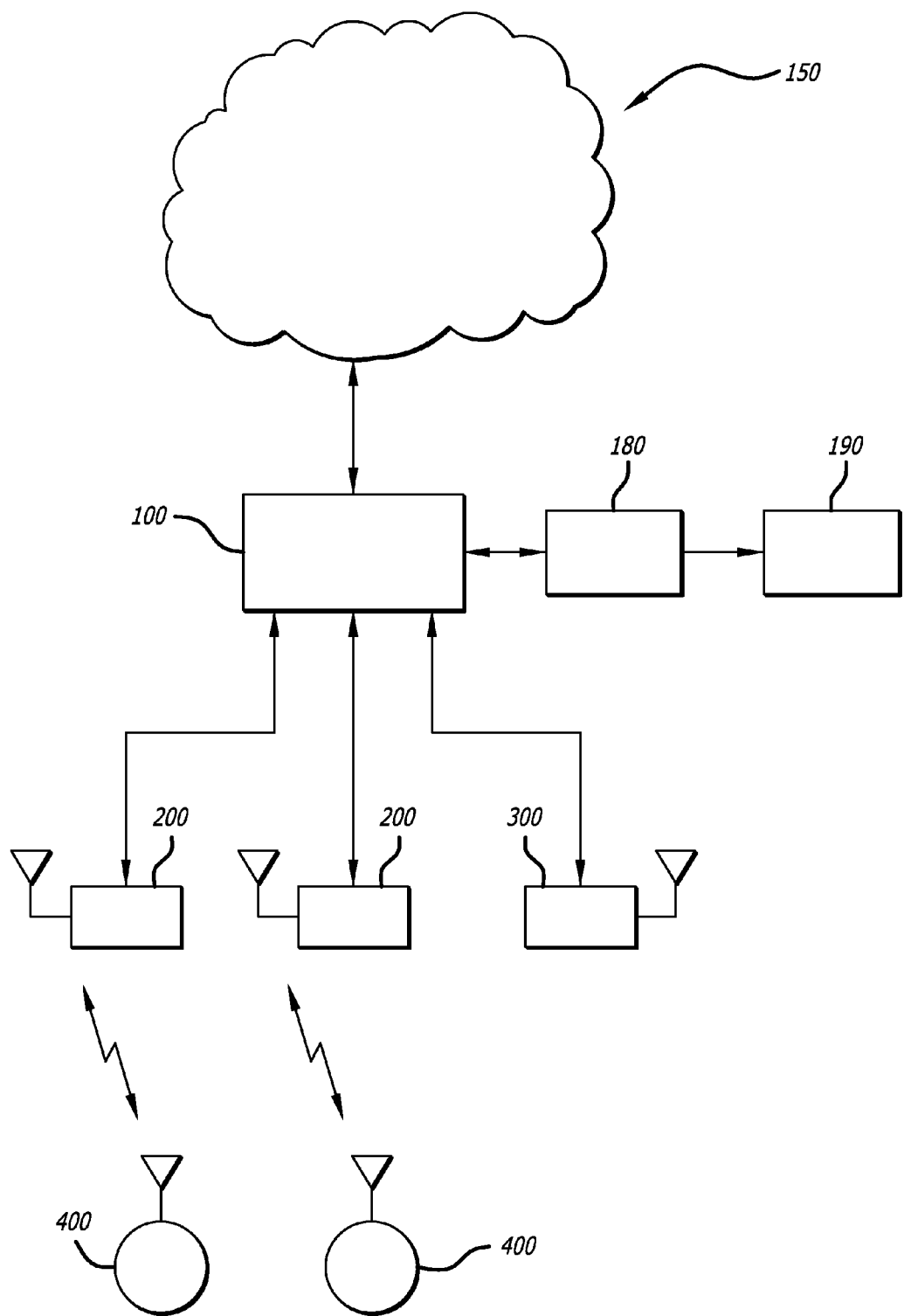

DISPLAYING A WIDEBAND SPECTRUM USING A NARROWBAND RECEIVER

CROSS-REFERENCES TO RELATED APPLICATIONS

This application claims the benefit of priority on U.S. Provisional Patent Application No. 61/321,210 filed Apr. 6, 2010 and entitled "Automatic conversion of access points to spectrum monitors and hybrid mode access point", U.S. Provisional Patent Application No. 61/321,179 filed Apr. 6, 2010 and entitled "Measuring and displaying wireless network quality", and U.S. Provisional Patent Application No. 61/321,214 filed Apr. 6, 2010 and entitled "Displaying a Wideband spectrum using a narrowband receiver", all incorporated herein by reference.

BACKGROUND OF THE INVENTION

The present invention relates to wireless digital networks, and in particular, to combining data from narrowband receivers to display representative wideband spectra.

Wireless digital networks are becoming ubiquitous in enterprises, providing secure and cost-effective access to resources. Those networks usually have a plurality of access points (AP) deployed through the enterprise. WiFi networks operating in accordance with IEEE 802.11 standards are examples of such networks.

Unfortunately, the frequencies used by these networks are shared. They are shared not only among the wireless networks themselves, but also with other non-network radiators. Non-network radiators, devices such as microwave ovens, wireless video streaming devices, cordless phones and the like, as well as other wireless networking devices, can cause interference with the operation of a network. Interfering devices can come and go, change their nature, and move around. As an example, replacing or adding a microwave oven in an employee lounge area can dramatically alter the interference present to a network.

In searching out sources of interference to a wireless network, various pieces of test equipment such as spectrum analyzers are used. A professional spectrum analyzer has a calibrated receiver of exquisite sensitivity, and is able to display and measure signals over a wide range of frequencies and amplitudes. They also range in price from a few thousand dollars to tens of thousands of dollars, and require a skilled operator. This places them outside the realm of the normal wireless network engineer.

What a digital wireless network does have is a plurality of narrowband radios, in the form of access points and wireless client devices. While these radios may not have the performance of a high quality spectrum analyzer, they are capable of collecting data on narrow portions of the spectrum used by the network.

What is needed are tools to combine narrowband spectrum information to display representative wideband spectra.

BRIEF DESCRIPTION OF THE DRAWINGS

The invention may be best understood by referring to the following description and accompanying drawings that are used to illustrate embodiments of the invention in which:

FIG. 1 shows devices in a wireless network.

DETAILED DESCRIPTION

Embodiments of the invention relate to methods of aggregating spectrum data captured from a narrowband radio to form a spectrum covering a much wider frequency band. Spectrum data such as Fast Fourier Transform (FFT) data captured from a narrowband receiver such as an IEEE 802.11 Wi-Fi receiver, are combined to display representative real-time FFT, average FFT, and FFT duty cycle data of a wideband spectrum.

Spectrum data is captured by a narrowband radio operating on a particular channel with a given frequency and channel width. Such data from multiple channel scans, overlapping or nonoverlapping, are combined to form a representative spectrum covering a much wider frequency band.

FIG. 1 shows a network in which controller 100 communicates with a digital network such as the Internet 150. Controller 100 also supports devices such as access points (AP) 200 and spectrum monitors (SM) 300. Wireless client devices 400 connect to APs 200 and access services such as the Internet 150 through controller 100.

Also shown in FIG. 1 is monitoring process 180 and display 190. While shown as a separate device communicating with controller 100, monitoring process 180 may operate within controller 100, or on any suitable computing device attached to the network, such as a laptop or desktop computer.

As is known to the art, controller 100, APs 200, and spectrum monitor 300 are purpose-made digital devices, each containing a processor, memory hierarchy, and input-output interfaces. In one embodiment of the invention, a MIPS-class processor such as those from Cavium or RMI is used. Other suitable processors, such as those from Intel or AMD may also be used. The memory hierarchy traditionally comprises fast read/write memory for holding processor data and instructions while operating, and nonvolatile memory such as EEPROM and/or Flash for storing files and system startup information. Wired interfaces are typically IEEE 802.3 Ethernet interfaces, used for wired connections to other network devices such as switches, or to a controller. Wireless interfaces may be WiMAX, 3G, 4G, and/or IEEE 802.11 wireless interfaces. In one embodiment of the invention, controllers and APs operate under control of a LINUX operating system, with purpose-built programs providing host controller and access point functionality.

Wireless client devices 400 contain a processor, memory hierarchy, and a number of interfaces including a wireless interface for communicating with APs 200. Typical wireless client devices include personal computers, handheld and tablet computers, Wi-Fi phones, wireless barcode scanners, and the like.

Traditional spectrum analyzers use wideband receivers so that they can monitor the entire frequency spectrum of interest at all times. The advantage of wideband receivers is that data can be collected and processed in real-time for an entire band to support the display of real-time FFT, FFT average, and FFT duty cycle. Traditional spectrum analyzers typically use purpose built hardware with specialized spectrum analysis software and are made by companies such as Agilent Technologies, Rhode & Schwarz, and Anritsu.

According to the present invention, methods are provided for supporting spectrum analysis functions using data collected from a narrowband radio such as an IEEE 802.11 radio. The radio may or may not be providing services to IEEE 802.11 clients while acting as a spectrum analyzer. Suitable radios include the radios in network access points and in wireless client devices where such data collection is supported by the drivers operating the radio. An IEEE 802.11 radio is only capable of receiving signals that fall within 5 to 40 MHz wide channels, since IEEE 802.11 channels are either 20 MHz or 40 MHz wide. Future IEEE 802.11 radios may be able to operate in 80 MHz channels. The width of the channel in an 802.11 radio receiver is restricted to the channel widths defined by the IEEE. There may also be other constraints such as the requirement to receive 802.11 frames, provide intrusion detection systems (IDS), and support interference classification that may limit the channel widths and dwell times that can be used by an 802.11 radio. The methods described here apply to any narrowband receiver such as that implementing IEEE 802.11, IEEE 802.16 or IEEE 802.15 standards or similar protocols that can be used to construct a standalone spectrum analyzer or a spectrum analyzer that provides spectrum analysis functions along with any combination of client connectivity services (e.g., as an Access Pont), Interference Classification, or IDS.

For spectrum analysis, the spectrum of interest at any time could be as wide as 200 MHz or more. In order to support such wideband spectrum visibility using a narrowband radio, the spectrum analyzer (radio) needs to "scan" multiple channels in real-time and combine the time and frequency domain information gathered from multiple channels to form a coherent view of the wideband spectrum. The spectrum analysis function selects the best set of FFT samples among the hundreds or thousands of available samples per second that accurately represents the view of the spectrum in order to display the entire spectrum on a device such as a computer display.

An FFT sample from a narrowband radio is represented as a set of amplitude values where each amplitude value corresponds to a frequency bin. The number of frequency bins in an FFT sample is determined by the channel width and the FFT size. For example, an FFT on a 20 MHz channel may produce FFT samples with 64 frequency bins, with each bin representing 312.5 KHz (i.e., 20 MHz/64). Other parameters associated with FFT include the starting frequency, the sampling time, and the sampling frequency or interval. The sampling time is the amount of time spent taking one FFT sample and the sampling frequency is the number of samples per second.

For each display interval, the dwell time, which is the amount of time to be spent looking for activity on each channel is selected. The dwell time on each channel may be fixed or may vary based on certain conditions. A fixed dwell time may be obtained by dividing the total display interval (e.g., one second) by a multiple of the number of channels to be scanned. For example, given a display interval of one second and the number of channels to be scanned of five, the default dwell time would be 200 milliseconds (1000/5) per channel. The default dwell time could also be 100 milliseconds (1000/(2×5)), where the spectrum analyzer scans each channel twice within the interval of one second. However, a fixed dwell time may not be appropriate under all circumstances. One such scenario is when the spectrum analyzer also supports IDS. A radio supporting IDS and spectrum analysis must be able to adaptively determine the dwell time on each channel so that IDS functions can be effectively supported without affecting the ability to receive representative FFT information from all channels for an accurate FFT display. The interferer profile is used to determine the amount of time spent on each channel (dwell time), the sequence of scanning, and the number of times to visit a channel per display interval. When interferers or rogue devices are detected on a specific 802.11 channel, those channels are scanned with a higher probability. Dwell times are also accordingly adjusted to capture sufficient 802.11 frames and/or FFT samples to perform the necessary IDS and interference classification functions.

Some channels are known or likely to have more interferers and/or 802.11 devices. For example, microwave ovens operate in a specific frequency range in the 2.4 GHz band, and 5 GHz cordless phones operate in a specific portion of the UNII band. According to the invention, the scanning algorithm assigns a higher weight to those channels to provide scanning preference and increased dwell time if necessary.

When a certain type of interferer (e.g. a frequency hopper such as a 2.4 GHz frequency hopping phone) is partially detected, the scanning algorithm adaptively changes the dwell time on a channel to receive sufficient samples on that channel that would help further classify the type and subtype of the interferer (e.g., Bluetooth, Xbox, cordless phone).

Another aspect of scanning according to the present invention is to select among multiple channel widths supported by the radio, including 20 MHz and 40 MHz channel scanning. The advantage of 20 MHz scanning is that all 802.11 devices (including those operating in 20 MHz and 40 MHz channelization) can be reliably detected. If only 40 MHz channels are scanned, 20 MHz 802.11 devices operating on the extended channel (i.e., one half of the 40 MHz channel) or 40 MHz 802.11 devices operating with the different combination of primary and extensions channels cannot be reliably detected. On the other hand, 40 MHz scanning has fewer channels to scan, and the FFT information obtained from 40 MHz channels is sufficient for the interference classifier. The process herein disclosed uses a combination of 20 MHz and 40 MHz scanning to optimize scan efficiency without sacrificing the ability to receive and decode 802.11 signals or classify interferers. A threshold determines the time interval within which the spectrum analyzer must scan all possible 20 MHz channels within the selected band at least once. The scanning order and dwell time can be combined with this threshold to select the ordering and dwell times of each 20 MHz or 40 MHz channel. The same process can be extended to 80 MHz channels or higher width channels when available.

Once the dwell time and scanning method are selected, the radio still could receive hundreds or thousands of FFT samples and 802.11 frames per second on each channel. FFT sample selection selects a best sample for each channel out of thousands and these best samples are combined together to construct the real-time view of the wideband display for every display interval. The best sample to display is not always the sample with the highest signal strength. The sample selection method according to the present invention uses at least three thresholds to select the best sample from each channel.

Prior to sample selection, the samples are categorized into Wi-Fi and non-Wi-Fi samples. The first threshold is used to select the Wi-Fi (802.11) FFT sample with the highest signal strength that exceeds this threshold. If no samples exceed the first threshold, no 802.11 sample is selected. The second threshold is used to select the non-Wi-Fi FFT sample with the highest signal strength that exceeds this threshold. As with the Wi-Fi FFT samples, if no samples exceed the threshold, no non-Wi-Fi FFT sample is selected. The third threshold is used to select the best of the Wi-Fi and non-Wi-Fi sample for display. The spectrum analyzer may be configured to prefer non-Wi-Fi samples or Wi-Fi samples at any time. Alternatively, the system may be configured to provide equal weight to both Wi-Fi and non-Wi-Fi samples. The third threshold, which may be positive or negative or zero, is added to the signal strength value of the non-Wi-Fi FFT sample. After the third threshold is applied and the signal strength value is normalized, the sample with the highest signal strength value is selected for display. The third threshold and therefore the preference for one type of sample over the other may be randomized, if necessary, to accurately portray the spectrum activity on the real channel.

Once the samples are selected per 802.11 channel (e.g., 20 MHz or 40 MHz), the samples need to be combined to construct the view of the wideband spectrum. Since the samples selected from adjacent channels may not be from the same time instance, the FFT display may show FFT bins from adjacent channels with significantly different amplitudes. A technique of using FFT average information to fill in the FFT bins at the edge of the channels, as long as the peaks of the FFT do not fall in these bins, is used to smooth out these differences in amplitude levels of adjacent channels.

Various methods known to the art may be used to fill in the FFT bins at the edge of the channels, such as simple averaging among bins. In such an approach, samples from bins of the same frequency are processed generating an average, weighted average, or other similar calculation. As an alternative, a smoothing process may be used incorporating data from nearby frequency bins in the process. An example of such a process would be the application of splines to smooth the transition from channel to channel across a range of frequency bins.

When the above described sample selection method is used and a frequency hopping device is active on the channel it is possible that the sample selection would always select samples with the highest signal strength on each channel. Since a frequency hopper hops at a higher rate, it is highly likely that the radio receives at least one FFT sample corresponding to a hopper on all channels it scans during a specified interval such as one second. However, this may result in a FFT display that incorrectly shows the frequency hopper's FFT signature as a constant source interferer. Selecting FFT samples in the presence of frequency hoppers uses the knowledge from the classification engine to select appropriate samples that correctly represents an instantaneous FFT signature. In this case, the FFT sample with the highest signal strength is not always selected for all channels. Once the identity of the frequency hopper is known based on the interferer classification, associated information such as signal strength, occupied bandwidth, hopping rate, hopping pattern, and burst size are known. Sample selection uses these parameters to select FFT sample signatures that match the frequency hopper's hopping pattern instead of choosing samples with highest signal strength on all channels.

Yet another requirement of the FFT display is the ability to see the average FFT display over a specified display interval. FFT averaging combines the converted 802.11 samples and other non-Wi-Fi FFT samples to calculate the average for every frequency bin. The 802.11 radio is programmed to deliver one FFT sample for every FFT_SCAN interval in order to minimize the impact on the CPU processing. For example, if two FFT samples are separated by only FFT_SCAN, it can be estimated that the signal was active for the entire duration of the FFT_SCAN. Therefore, the duration of the non-Wi-Fi interferer signal is accurately estimated by calculating the time difference between consecutive FFT samples. The duration of signals is accumulated in units of time that is a multiple of the FFT sampling duration along with aggregated amplitude per bin. The duration of a received Wi-Fi frame is calculated based on the modulation, coding, length and other related parameters. The converted Wi-Fi FFT samples are then used to update the FFT amplitude bins and duration using the same units as the non-Wi-Fi FFT signature. When neither Wi-Fi nor non-Wi-Fi signals are present, all FFT bin amplitudes are updated with the amplitude of the noise floor in that instant. The duration is also updated accordingly. Once every update interval (e.g., one second), the FFT average amplitude for every bin is calculated by dividing the total amplitude per bin by the total time spent on each channel.

Similar to the FFT average, the FFT duty cycle also needs to be calculated for display purposes. The FFT duty cycle indicates the percentage of time a specific FFT bin has signal amplitude that is above a specific FFT_DUTY_CYCLE_SIGNAL_THRESHOLD. The duration of the non-FFT signal above this threshold is accumulated per bin similar to the estimation process described in FFT averaging for each channel. When Wi-Fi frames are received, the frames are converted into FFT samples and the FFT duration bins are updated if the corresponding bin in the converted FFT sample exceeds the FFT_DUTY_CYCLE_SIGNAL_THRESHOLD threshold. Once every update interval (e.g., one second), the FFT duty cycle for every bin is calculated by dividing the accumulated duration for each bin by the total time spent on a channel.

According to the invention, spectrum data is collected by one or more radios on a network, such as access points, dedicated spectrum monitors, or from suitably equipped client devices. Spectrum data may be combined on a device producing a wideband spectrum, or may be sent in combined or uncombined form to another device such as monitoring process 180 for combining into a wideband spectrum according to the processes described herein. As an example, samples from radios are combined by monitoring process 180 and displayed on display 190. Samples from physically close APs may be combined to provide estimates of the wideband spectrum in a particular area. These samples may be combined with samples from suitable client devices in the area. Such samples may be stored in time-stamped fashion for later combination and analysis.

Monitoring process 180 and display 190 may be present as a separate device on the network, or as part of another device such as a wireless client in the form of a suitable desktop, laptop, or handheld computer. Sample data from radios such as access points 200 station monitor 300 and client device 400 may be stored locally or stored centrally such as in controller 100 for later retrieval and analysis. Such samples may be pushed from a device such as access point 200 to a collection point such as monitoring process 180, or may be polled or pulled by monitoring process 180 working with access point 200.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

I claim:

1. A non-transitory machine readable medium comprising a set of instructions which, when executed by one or more hardware processors, causes performance of a set of operations comprising:
   accumulating spectral data from a radio scanning a plurality of channels;
   for each of the plurality of channels, selecting spectral data representing (a) a signal strength of a Wi-Fi signal transmitted on each channel or (b) a signal strength of a non-Wi-Fi signal transmitted on each channel;
   the selecting operation comprising:
      for a first channel of the plurality of channels: selecting a first spectral data representing a signal strength of a Wi-Fi signal transmitted on the first channel;
      for a second channel of the plurality of channels: selecting a second spectral data representing a signal strength of a non-Wi-Fi signal transmitted on the second channel;
   combining the first spectral data re representing the signal of the Wi-Fi signal transmitted on the first channel and the second spectral data representing the signal strength of the non-Wi-Fi signal transmitted on the second channel to produce a spectrum display representing both: the signal strength of the Wi-Fi signal transmitted on the first channel and the signal strength of the non-Wi-Fi signal transmitted on the second channel.

2. The machine readable medium of claim 1 wherein the first spectral data representing the signal strength of the Wi-Fi signal is selected for the first channel based at least on the signal strength of the Wi-Fi signal exceeding a threshold value.

3. The machine readable medium of claim 1 wherein the first spectral data representing the signal strength of the Wi-Fi signal is selected for the first channel based at least on the signal strength of the Wi-Fi signal exceeding a signal strength of a non-Wi-Fi signal transmitted on the first channel.

4. The machine readable medium of claim 1 the first spectral data representing the signal strength of Wi-Fi signal is selected for the first channel based at least on (a) the signal strength of the Wi-Fi signal exceeding a signal strength of a non-Wi-Fi signal transmitted on the first channel and (b) the signal strength of the non-Wi-Fi signal transmitted on the first channel not meeting a threshold value.

5. The machine readable medium of claim 1 wherein the second spectral data representing the signal strength of the non-Wi-Fi signal is selected for the second channel based at least on the signal strength of the non-Wi-Fi signal transmitted on the second channel exceeding a signal strength of a Wi-Fi signal transmitted on the second channel.

6. The machine readable medium of claim 1 wherein the second spectral data representing the strength of the non-Wi-Fi signal is selected for the second channel based at least on the signal strength of the non-Wi-Fi signal transmitted on the second channel exceeding a threshold value.

7. A non-transitory machine readable medium comprising instructions which, when executed by one or more hardware processors, causes performance of operations comprising:
   detecting at least one wireless signal from an interferer device on a first channel of a plurality of channels without detecting any wireless signal from the interferer device on a second channel of the plurality of channels;
   responsive to the detecting operation:
      setting a first dwell time for the first channel of the plurality of channels: and
      setting a second dwell time for the second channel of the plurality of channels that is shorter than the first dwell time for the first channel;
   scanning the first channel for a first period of time, corresponding to the first dwell time, to generate a first spectral data representing a signal strength of at least one wireless signal detected on the first channel; and
   scanning the second channel for a second period of time, corresponding to the second dwell time, to generate a second spectral data representing a signal strength of at least one wireless signal detected on the second channel.

8. The machine readable medium of claim 7, wherein the first dwell time and the second dwell time are further based on a device type of the interferer device.

9. The machine readable medium of claim 7, wherein the first dwell time and the second dwell time are further based on a hopping rate of the interferer device for hopping between different channels of the plurality of channels to transmit a plurality of wireless signals.

10. The machine readable medium of claim 7, wherein the first dwell time and the second dwell time are further based on an occupied bandwidth for wireless signals transmitted by the interferer device.

11. The machine readable medium of claim 7, wherein the first dwell time and the second dwell time are further based on a hopping pattern of the interferer device for hopping between different channels of the plurality of channels to transmit a plurality of wireless signals.

12. The machine readable medium of claim 7, wherein the operations further comprise accumulating the first spectral data and the second spectral data to generate spectrum display representing one or more wireless signals detected during the first period of time on the first channel and one or more wireless signals detected during the second period of time on the second channel.

13. The machine readable medium of claim 7, wherein the first dwell time and the second dwell time are further based on a frequency band associated with the first channel and a frequency band associated with the second channel.

14. A system comprising:
   at least one device including a hardware processor;
   the system being configured to perform operations comprising:
   accumulating spectral data from a radio scanning a plurality of channels;
   for each of the plurality of channels, selecting spectral data representing (a) a signal strength of a Wi-Fi signal transmitted on each channel or (b) a signal strength of a non-Wi-Fi signal transmitted on each channel;
   the selecting operation comprising:
      for a first channel of the plurality of channels: selecting a first spectral data representing a signal strength of a Wi-Fi signal transmitted on the first channel;
      for a second channel of the plurality of channels: selecting a second spectral data representing a signal strength of a non-Wi-Fi signal transmitted on the second channel;
   combining the first spectral data representing the signal strength of the Wi-Fi signal transmitted on the first channel and the second spectral data representing the signal strength of the non-Wi-Fi signal transmitted on the second channel to produce a spectrum display representing both: the signal strength of the Wi-Fi signal transmitted on the first channel and the signal strength of the non-Wi-Fi signal transmitted on the second channel.

15. The system of claim 14, wherein the first spectral data representing the signal strength of the Wi-Fi signal is selected for the first channel based at least on the signal strength of the Wi-Fi signal exceeding a threshold value.

16. The system of claim 14, wherein the first spectral data representing the signal strength of the Wi-Fi signal is selected for the first channel based at least on the signal strength of the Wi-Fi signal exceeding a signal strength of a non-Wi-Fi signal transmitted on the first channel.

17. The system of claim 14, the first spectral data representing the signal strength of the Wi-Fi signal is selected for the first channel based at least on (a) the signal strength of the Wi-Fi signal exceeding a signal strength of a non-Wi-Fi signal transmitted on the first channel and (b) the signal strength of the non-Wi-Fi signal transmitted on the first channel not meeting a threshold value.

18. The system of claim 14, wherein the second spectral data representing the signal strength of the non-Wi-Fi signal is selected for the second channel based at least on the signal strength of the non-Wi-Fi signal transmitted on the second channel exceeding a signal strength of a Wi-Fi signal transmitted on the second channel.

19. The system of claim 14, wherein the second spectral data representing the signal strength of the non-Wi-Fi signal is selected for the second channel based at least on the signal strength of the non-Wi-Fi signal transmitted on the second channel exceeding a threshold value.

20. A system comprising:
   at least one device including a hardware processor;
   the system being configured to perform operations comprising:
   detecting at least one wireless signal from an interferer device on a first channel of a plurality of channels without detecting any wireless signal from the interferer device on a second channel of the plurality of channels;
   responsive to the detecting operation:
      setting a first dwell time for the first channel of the plurality of channels; and
      setting a second dwell time for the second channel of the plurality of channels that is shorter than the first dwell time for the first channel;
   scanning the first channel for a first period of time, corresponding to the first dwell time, to generate a first spectral data representing a signal strength of at least one wireless signal detected on the first channel; and
   scanning the second channel for a second period of time, corresponding to the second dwell time, to generate a second spectral data representing a signal strength of at least one wireless signal detected on the second channel.

21. The system of claim 20, wherein the first dwell time and the second dwell time are further based on a device type of the interferer device.

22. The system of claim 20, wherein the first dwell time and the second dwell time are further based on a hopping rate of the interferer device for hopping between different channels of the plurality of channels to transmit a plurality of wireless signals.

23. The system of claim 20, wherein the first dwell time and the second dwell time are further based on an occupied bandwidth for wireless signals transmitted by the interferer device.

24. The system of claim 20, wherein the first dwell time and the second dwell time are further based on a hopping pattern of the interferer device for hopping between different channels of the plurality of channels to transmit a plurality of wireless signals.

25. The system of claim 20, wherein the operations further comprise accumulating the first spectral data and the second spectral data to generate spectrum display representing one or more wireless signals detected during the first period of time on the first channel and one or more wireless signals detected during the second period of time on the second channel.

26. The system of claim 20, wherein the first dwell time and the second dwell time are further based on a frequency band associated with the first channel and a frequency band associated with the second channel.

* * * * *